Dec. 12, 1933.  J. L. WENTZ  1,938,650
CONVEYER
Filed July 6, 1929  2 Sheets-Sheet 1

INVENTOR
Jere L. Wentz
BY
M. Theodore Simmons
ATTORNEY

Dec. 12, 1933.  J. L. WENTZ  1,938,650

CONVEYER

Filed July 6, 1929  2 Sheets-Sheet 2

INVENTOR
Jere L. Wentz
BY
H. Theodore Simmons
ATTORNEY

Patented Dec. 12, 1933

1,938,650

UNITED STATES PATENT OFFICE 1,938,650

CONVEYER

Jere L. Wentz, Passaic, N. J.

Application July 6, 1929. Serial No. 376,389

8 Claims. (Cl. 198—158)

My invention relates to portable belt conveyers and more particularly to a type of conveyer adapted to handle bulky and awkward shaped articles.

My invention is to some extent an improvement upon the well known chain elevator for barrels and boxes in that it is adaptable to the same class of services. However, there are numerous services to which chain type elevators are wholly inapplicable, as is well known in practice and also no one has heretofore adapted the woven or fabric belt type conveyer to the services heretofore filled by the chain type.

Furthermore the conveyer of this application can be adapted for handling products which heretofore have not been handled by any type of conveyer. For the purpose of this application only one such instance will be referred to, that of handling bunches of bananas such as removing them from the hold of a ship onto the dock or wharf.

It is one object of my invention to provide a belt type of conveyor adaptable for the several services indicated.

It is another object of my invention to provide a belt conveyer of the type indicated having a flight pivoted to the belt.

It is a further object of my invention to provide a belt conveyer having flexible and collapsible flights.

It is a still further object of my invention to provide a belt conveyer with a flight having a counterweight for positioning the same.

It is a still further object of my invention to provide a belt conveyer having a loose body, an upright support therefor and a positioning member for the support.

Other and further objects of my invention will be apparent from the following detailed description in connection with the accompanying drawings, wherein—

Figure 1:
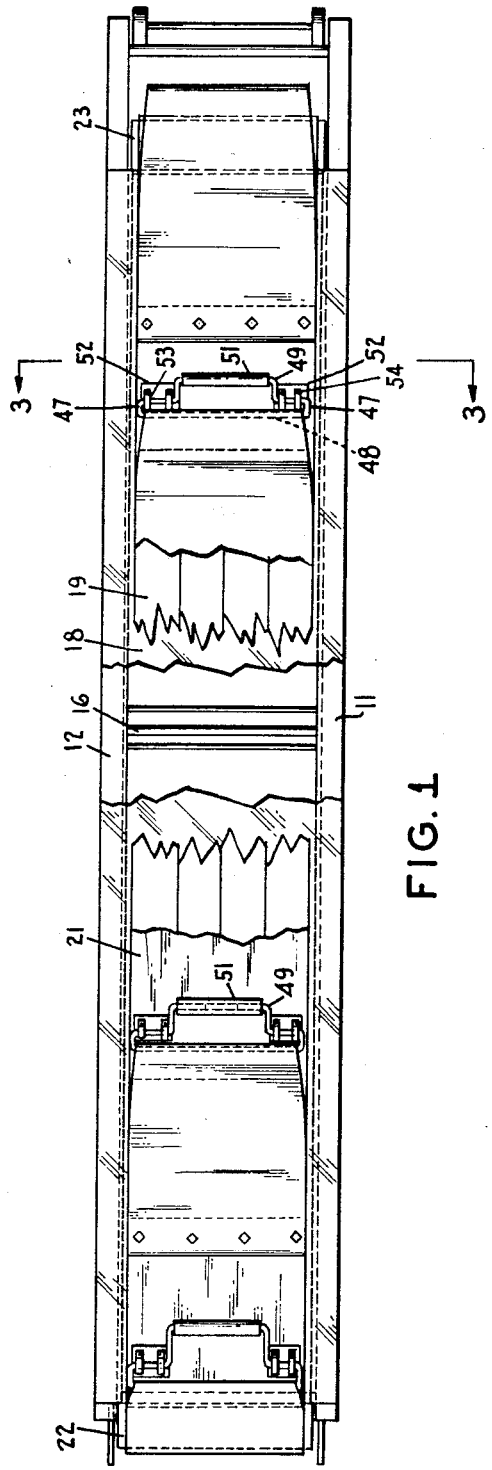
Figure 1 is a top plan view of a belt conveyer of the type herein referred to, parts being broken away to facilitate the illustration.

The frame of the conveyer comprises a plurality of angle irons 11, 12, 13, and 14 extending the length of the machine and spaced apart vertically by a number of spacing plates 15 secured to the respective pairs of angle irons 11 and 13, 12 and 14. The sides are held in spaced-apart relationship by a plurality of cross bars 16 and 17 respectively. The frame members may be sectionalized if desired so that varying lengths of conveyers can be constructed as desired.

Mounted across the top of the sides of the frame is a sheet metal plate 18 which extends nearly the full length of the machine and has secured thereto a plurality of runners or boards 19 which provide a trackway over which the conveyer belt 21 slides.

The belt 21 is endless and encircles rollers 22 and 23 that are located near the opposite ends of the frame. The rollers are mounted respectively in bearing blocks 24 and 25 which are in turn adjustable laterally in the guides 26 and 27 by means of the screw threaded adjusting rods 28 and 29, a well known practice.

The conveyer is driven from an electric motor 31 mounted upon a platform 32 located on the frame of the machine between the upper and lower reaches of the belt. The electric motor has a belt connection 33 to a pulley 34, mounted upon shaft 35, from which the drive extends from a second pulley 36 on the shaft 35, by means of a belt 38, to a pulley 39 on the shaft of the roller 22. I prefer to have two pulleys 36 upon the shaft 35 and two pulleys 39 upon the shaft of roller 22, so as to equalize the drive thereof.

In the machine shown in Figs. 1 to 4 inclusive the belt has mounted upon it a plurality of flights, each of which comprises a canvas or other flexible body 41 having loops 42 and 43 formed at opposite ends thereof. A bar 44 extends through loop 42 and this constitutes the lowermost end of the flight which is secured fast to the belt 21 by means of a plurality of bolts 45 that extend through the belt, the loop 42 and the bar 44. It will be noted that the bolts 45 have enlarged flat heads which are located on the under surface of the belt and constitute a wearing surface for the belt at those points. Furthermore, the heads slide readily over the trackway 19.

The loop 43 has passing therethrough the supporting frame 46, the body of the flight extending loosely between the bar and the frame; and resting to a considerable extent upon the belt. Frame 46 comprises a pair of upright forwardly curved arms 47 joined together by cross bar 48 and terminating in rearwardly and horizontally disposed arms 49. As is shown in Fig. 1, the ends of arms 49 are not joined together but are spanned by a weighted roller or other member 51, the purpose of which will be hereinafter explained.

Each of the arms 49 has a portion bent inwardly which is utilized to provide a hinge or pivotal connection for the flight 41. Near opposite edges of the belt 21 are fastened plates 52 having clamps 53 secured thereto by means of the bolts 54 which also serve to secure the plates 52 upon the belt. The clamps 53 loosely grip the horizontal portions of arms 49 so that they are free to pivot thereabout. In service, a certain amount of weight and pressure occurs upon the supporting frame of the flight thus exerting a leverage at the point of hinging thereof, and the plates 52 serve the purpose of distributing that weight and leverage, as well as reducing the wear and tear upon the conveyer at these points.

The purpose of the hinging is two-fold, namely to permit the flight to distend when passing around the end rollers 22 and 23, and permitting the collapsing of the flight when not in use so as to require the minimum head room for the return portion of the belt.

Figure 2:
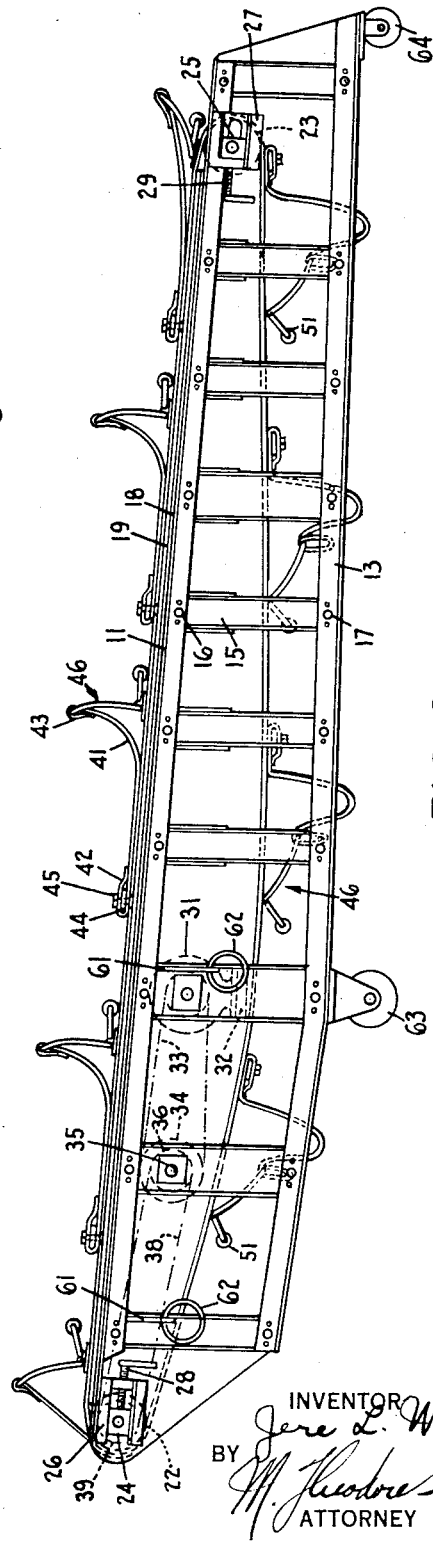
Fig. 2 is a side elevation of the conveyer of Fig. 1.
Figure 3:
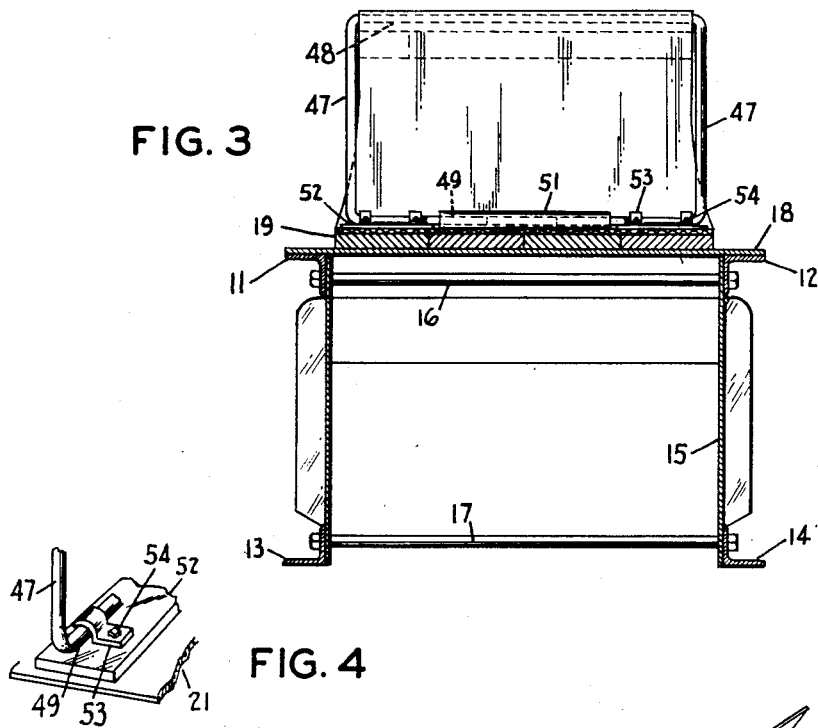
Fig. 3 is a vertical section on the line 3—3 of Fig. 1.
Figure 4:
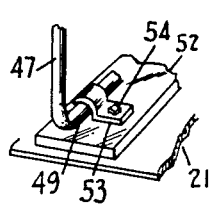
Fig. 4 is an enlarged detail view illustrating the mounting of the flights upon the belt.

The distending of the flight permitting the same to pass around the end rollers 22 and 23 is illustrated at the left hand side of Fig. 2 where one of the flights is shown part way around the roller 22. It will be noted that the fabric of the flight has been drawn taut which has caused support 46 to move upon the hinge 53.

As the flight moves along the return or under portion of the belt the weighted roller 51 hangs down away from the belt and this moves the support 46 from its vertical position thus reducing the height of the space or head room required for the passing of a flight on its return to the feed end of the machine. The body 41 of the flight being flexible, it may hang below the support, but it will readily pass over any obstruction encountered.

As the flexible portion 41 of the flight passes around the roller 23 and beyond onto the upper reach of the belt, it is again rendered taut as shown on the right hand side of Fig. 2. As the weighted roll 51 of the support passes beyond the roll 23 onto the upper reach of the belt it is of sufficient weight to snap the support 46 into its upright position so that the flight is then ready to receive the article to be carried to the delivery end of the machine.

As it is frequently desirable to lower the conveyer into the hold of a ship or to suspend it at various vertical inclinations the frame is provided on each side with eyelets 61 in which are loosely secured rings 62. The rings may receive grappling hooks, ropes, or other means by which the machine may be suspended in whatever position desired.

In order that the machine may be moved about readily from place to place it is provided on its under surface with sets of rollers 63 and 64 near the forward and rear ends of the frame respectively. It will be noted that the wheels 64 project beyond the end of the frame so that when the conveyer is in a vertical position it may rest upon the rollers 64.

The operation of the machine may be briefly explained. The conveyer is placed in whatever inclined or horizontal position it is desired to use the same, and the belt set in operation. A bunch of bananas or other article is placed upon the flight at one end of the belt and it is carried to the other end where it is either discharged onto another carrier or lifted off by an attendant at that end. The particular construction of flight lends itself to the particular service. The flight just described is particularly suitable for handling bananas since the long flat portion allows the bunch to be put in position without striking either the upright support or the rigid bar and retaining bolts.

Figure 5:
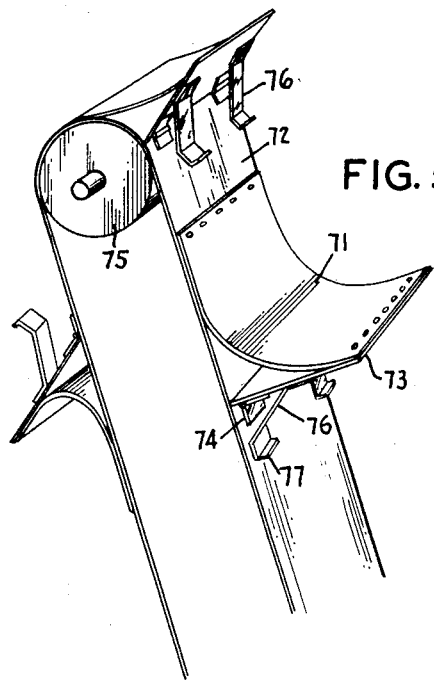
Fig. 5 is a partial perspective view of a modified form of conveyer showing a different mounting for the flight.

Referring to Fig. 5, there is shown a slighty modified form of flight which nevertheless preserves the arrangement requiring but a single hinge for the flight upon the belt. In this form, one end of the flight body 71 is fastened to the belt 72 by means of rivets, bolts, or other suitable means, and the opposite end is likewise riveted or otherwise secured to a rigid upright support 73 which may or may not be an enlarged flat piece extending the full width of the belt. The support 73 is hinged as at 74 to the body of the belt 72 so that the flight may be distended or collapsed and thereby readily pass around the end rollers of the machine, one of which is indicated at 75. The support 73 is maintained in proper position upon the belt by means of a pair of supporting arms 76 that are secured to the support 73 and are provided with flat supporting surfaces 77, which may be weighted if desired, and are adapted to rest against the belt when the flight is in operating position as shown at the right hand side of Fig. 5. Except for the differences in construction and the fact that the flight shown in Fig. 5 is better suited to certain classes of service, the machine described in Fig. 5 is otherwise similar to, and has all the advantages of the machine shown in Figs. 1 to 4 inclusive.

Figure 6:
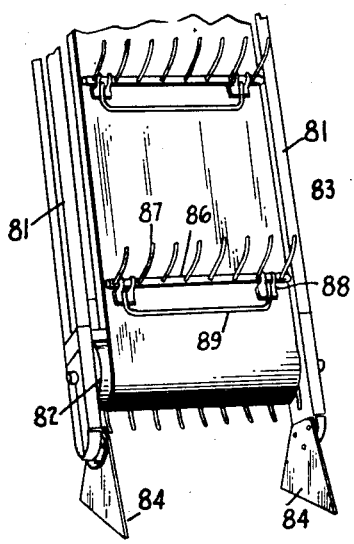
Fig. 6 is a partial perspective of a further modified form of belt conveyer having a forked flight.

In Fig. 6 is shown a second modified form of machine with a different form of flight. In this figure is shown a second modified form of machine with a different form of flight. In this figure the lower end of the machine is shown as having side frame members 81 in which is journaled a roller 82 around which passes belt 83. The machine is supported upon triangular shaped supports 84, each side frame members being secured at the apex of a triangle by means of a flanged collar with the base of the triangle adapted to rest upon the floor or other support. The supports may be separate units if desired, and thus detachable from the frame members 81, the ends of the frame being receivable in said flanges or collars.

The belt 83 is provided with a plurality of flights comprising a rigid bar 86 extending across the width of the belt 83 and having mounted therein a plurality of curved tines 87. The bar 86 is pivotally mounted upon the belt 83 by means of clamps 88 so that the flight is free to pivot therein. The bar 86 also has secured thereto and projecting laterally therefrom a U-shaped support or brace 89 which may or may not be provided with a weight similar to the weight 51 in the machine of Figs. 1 to 4.

Otherwise, the machine shown in Fig. 6 is similar to and possesses the same advantages of the machine of Figs. 1 to 4 inclusive except for the adaptation to the different classes of service.

Modifications may be made in the location and arrangement of parts within the spirit and scope of my invention, and such modifications are intended to be covered by the appended claims.

I claim:

1. A conveyer having side frames, appropriate cross bracing therebetween, rollers mounted at opposite ends of said machine, an endless belt encircling said rollers having mounted thereupon a plurality of flights each composed of a flexible material, a collapsible support therefor, and separate means for raising the support and holding the same upright along one reach of the belt between said rollers, and a motor operatively connected to drive said belt.

2. A conveyer having side frames, appropriate cross bracing therebetween, rollers mounted at opposite ends of said machine, an endless belt encircling said rollers having mounted thereupon a plurality of flights having a collapsible support and a weighted element for rendering said flight operative, and a motor operatively connected to drive said belt.

3. A conveyer having side frames, appropriate cross bracing therebetween; rollers mounted at opposite ends of said machine; an endless belt encircling said rollers having a plurality of flights secured thereto comprising a flexible member secured at one end to said belt and adapted to lie upon the surface of the belt a substantial distance, an upright support secured to said belt and to which the other end of said flight is secured and a horizontal weighted bracing member cooperating with said uprights; and a motor operatively connected to drive said belt.

4. A conveyer having side frames, appropriate cross bracing therebetween, rollers mounted at opposite ends of said machine, an endless belt encircling said rollers having a plurality of flights secured thereto comprising a flexible member, a curved upright support to which said flexible member is secured, a hinged connection for the upright upon said belt, a horizontally extending positioning member cooperating with the upright support, and a weight carried by said horizontal member, and a motor operatively connected to drive said belt.

5. A flight for a conveyer belt comprising a flexible material adapted to be secured to the belt, a supporting frame for maintaining the flexible material in upright position, a positioning arm for the frame, and separate means for moving the supporting frame into upright position.

6. A flight for a conveyer belt comprising a flexible material adapted to be secured to the belt, an upright support for maintaining the flexible material in upright position, and weighted means adapted to position the upright support.

7. A conveyer having side frames, appropriate cross bracings therebetween, rollers mounted at opposite ends of said machine, an endless belt encircling said rollers having a plurality of flexible flights secured thereto, said flights comprising a fabric secured to the belt, an open frame to which the other end of the fabric is secured, the frame being pivotally mounted upon the belt, and separate means to maintain the frame in article receiving position during the operation of the conveyer, and a motor operatively connected to drive said belt.

8. A conveyer having side frames, appropriate cross bracing therebetween, rollers mounted at opposite ends of said machine, an endless belt encircling said rollers having mounted thereupon a plurality of flights each composed of a flexible material, a collapsible support therefor, and separate means for automatically raising the support and holding the same upright along one reach of the belt between said rollers, and a motor operatively connected to drive said belt.

JERE L. WENTZ.